United States Patent
Rook

(10) Patent No.: US 9,938,003 B2
(45) Date of Patent: Apr. 10, 2018

(54) MULTIPART TORQUE BAR FOR VIBRATION SUPPRESSION

(71) Applicant: Goodrich Corporation, Charlotte, NC (US)

(72) Inventor: Todd Rook, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 302 days.

(21) Appl. No.: 14/976,241

(22) Filed: Dec. 21, 2015

(65) Prior Publication Data
US 2017/0174330 A1 Jun. 22, 2017

(51) Int. Cl.
| | |
|---|---|
| B64C 25/42 | (2006.01) |
| F16F 7/08 | (2006.01) |
| F16D 65/827 | (2006.01) |
| B64C 25/44 | (2006.01) |
| F16D 55/36 | (2006.01) |
| F16D 55/00 | (2006.01) |
| F16D 65/02 | (2006.01) |

(52) U.S. Cl.
CPC .............. B64C 25/42 (2013.01); B64C 25/44 (2013.01); F16D 55/36 (2013.01); F16D 65/827 (2013.01); F16F 7/08 (2013.01); *F16D 2055/0008* (2013.01); *F16D 2065/1384* (2013.01); *F16D 2065/1392* (2013.01)

(58) Field of Classification Search
CPC .......... F16D 55/02; F16D 65/10; F16D 65/82; F16D 65/827; F16D 65/847; B64C 25/44; B64C 25/42
See application file for complete search history.

(56) References Cited

U.S. PATENT DOCUMENTS

| | | | | |
|---|---|---|---|---|
| 5,024,297 A | * | 6/1991 | Russell | F16D 55/36 188/18 A |
| 5,851,056 A | * | 12/1998 | Hyde | B60B 19/10 188/264 G |
| 5,915,503 A | | 6/1999 | Enright | |
| 6,003,954 A | * | 12/1999 | Everhard | F16D 55/36 188/71.5 |
| 6,241,062 B1 | | 6/2001 | Enright | |
| 7,390,067 B2 | * | 6/2008 | Tong | B64C 25/36 188/71.5 |
| 7,475,762 B2 | * | 1/2009 | Kaczynski | C23C 4/06 188/18 A |

(Continued)

FOREIGN PATENT DOCUMENTS

| | | |
|---|---|---|
| EP | 2189676 | 5/2010 |
| WO | 2008097386 | 8/2008 |
| WO | 2009082397 | 7/2009 |

OTHER PUBLICATIONS

European Search Report dated Jul. 19, 2017 in EP Application 16204882.1.

*Primary Examiner* — Jason R Bellinger
(74) *Attorney, Agent, or Firm* — Snell & Wilmer, L.L.P.

(57) ABSTRACT

A multipart torque bar is provided. Multipart torque bar may include an outer torque bar body, an inner torque bar body, a mounting hole, and a connecting end. Outer torque bar body may include a groove, wherein the inner torque bar body may removably insert within the groove. Multipart torque bars of the present disclosure can exhibit improved characteristics, such as improved vibration damping.

20 Claims, 6 Drawing Sheets

(56) References Cited

U.S. PATENT DOCUMENTS

| | | | |
|---|---|---|---|
| 7,488,044 B2 * | 2/2009 | Scelsi | B64C 25/36 |
| | | | 188/71.5 |
| 7,546,910 B2 | 6/2009 | Thorp et al. | |
| 8,157,062 B2 | 4/2012 | Enright et al. | |
| 8,714,571 B2 | 5/2014 | Nataraj et al. | |
| 2006/0006729 A1 * | 1/2006 | Rutten | B64C 25/42 |
| | | | 301/6.2 |

* cited by examiner

MULTIPART TORQUE BAR FOR VIBRATION SUPPRESSION

FIELD

The present disclosure relates to components of wheel and brake assemblies, and more specifically, to a multipart torque bar.

BACKGROUND

Torque bars are typically used in aircraft wheel and brake assemblies to couple the wheels to the rotors of the brake assembly. Torque bars typically extend from an inner surface of the wheel in a direction parallel to the rotational axis of the wheel, and are subject to static and dynamic deflection and vibration. Torque bars of the prior art typically comprise a single-piece body having a bolted end and a slender pin end that is flexible. Torque bars are main structural components in the primary load path of the brake torque.

SUMMARY

In various embodiments, a multipart torque bar may comprise an outer torque bar body, an inner torque bar body, a mounting hole, and a connecting end. Outer torque bar body may have a first end and a second end, a top surface and a bottom surface, and a groove. Groove may define an opening on outer torque bar body beginning on the first end of the top surface and extending in an axial direction proximate the second end. Inner torque bar body may have a first end and a second end, and a top surface and a bottom surface. Inner torque bar body may be configured to removably insert within the groove of outer torque bar body. Mounting hole may be located on the top surface of inner torque bar body, by the first end of inner torque bar body. Connecting end may be located on the second end of outer torque bar body.

In various embodiments, a wheel and brake assembly may comprise a wheel, a brake assembly, and a multipart torque bar. The wheel may have a radially inner surface and a connecting hole. The multipart torque bar may comprise an outer torque bar body, an inner torque bar body, a mounting hole, and a connecting end. Outer torque bar body may have a first end and a second end, a top surface and a bottom surface, and a groove. Groove may define an opening on outer torque bar body beginning on the first end of the top surface and extending in an axial direction proximate the second end. Inner torque bar body may have a first end and a second end, and a top surface and a bottom surface. Inner torque bar body may be configured to removably insert within the groove of outer torque bar body. Mounting hole may be located on the top surface of inner torque bar body, by the first end of inner torque bar body. Connecting end may be located on the second end of outer torque bar body. The multipart torque bar may be coupled to the radially inner surface at the mounting hole. The connecting end may be coupled to the connecting hole.

In various embodiments, a method for installing a multipart torque bar onto a wheel and brake assembly may comprise inserting an inner torque bar body into an outer torque bar body to form the multipart torque bar. Outer torque bar body may have a first end and a second end, a top surface and a bottom surface, and a groove. Groove may define an opening on outer torque bar body beginning on the first end of the top surface and extending in an axial direction proximate the second end. Inner torque bar body may have a first end and a second end, and a top surface and a bottom surface. Inner torque bar body may be configured to removably insert within the groove of outer torque bar body. The wheel may comprise a radially inner surface and an at least one tie bolt hole. The method may also comprise coupling the multipart torque bar to the wheel.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
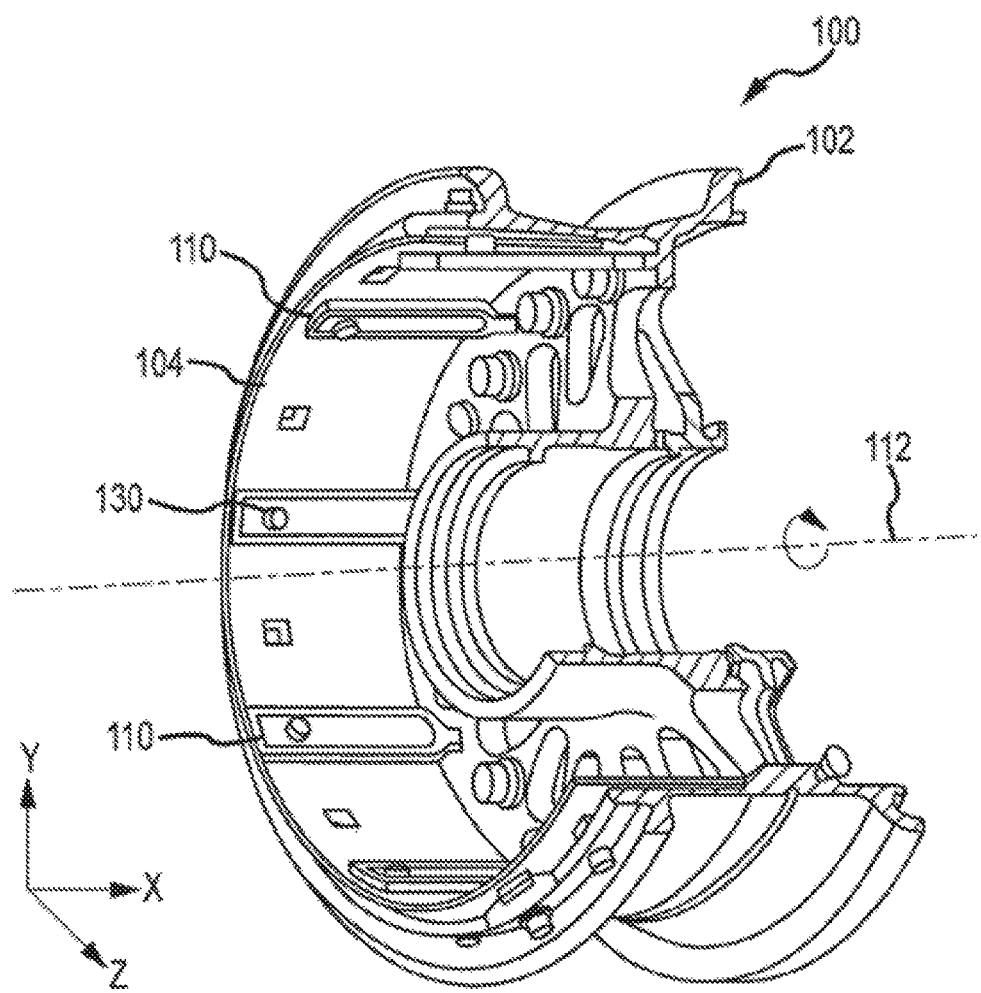
FIG. 1 illustrates a perspective view of a wheel and brake housing, in accordance with various embodiments.
Figure 2:
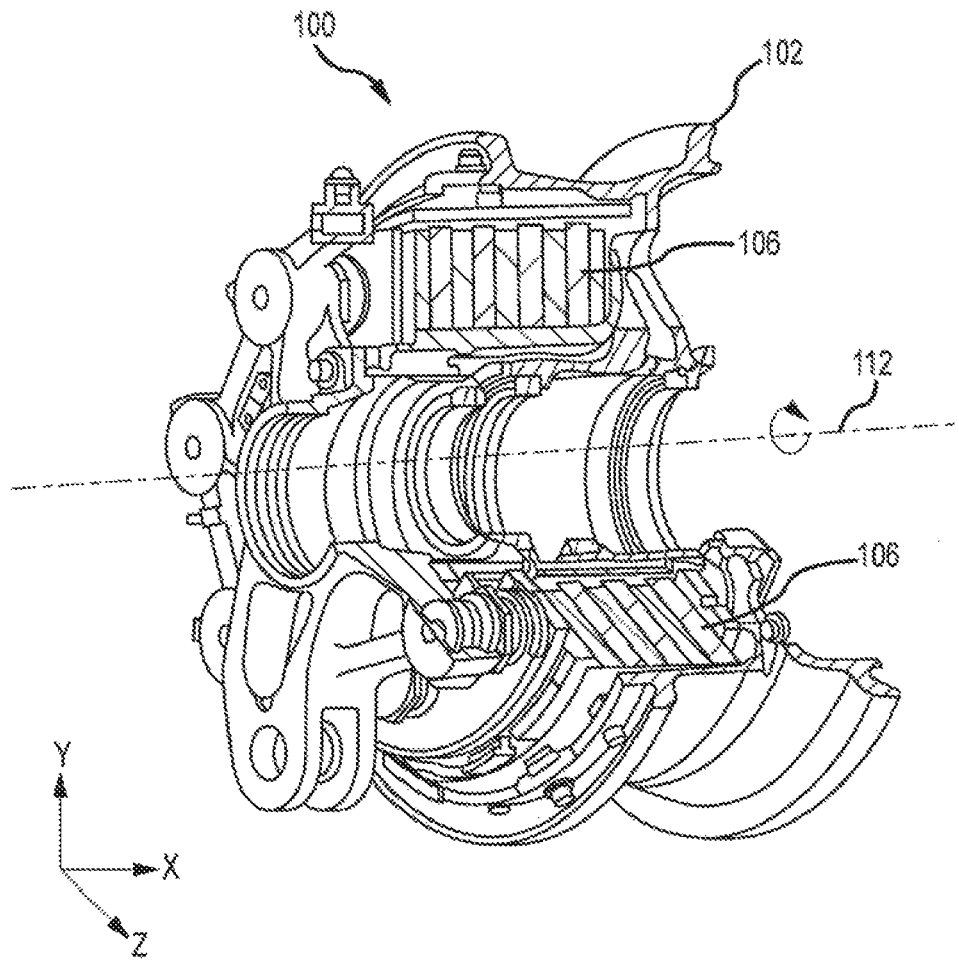
FIG. 2 illustrates a perspective view of a wheel and brake housing, in accordance with various embodiments.

In various embodiments and with reference to FIGS. 1 and 2, a wheel and brake assembly 100 can comprise a wheel 102 having a radially inner surface 104. A brake assembly 106 is disposed within wheel 102. In various embodiments, a plurality of torque bars 110 are oriented parallel to an axis of rotation 112 and coupled to wheel 102 and radially inner surface 104, and configured to engage with brake assembly 106.

The torque bar is a main structural component in the primary load path of the brake torque. During braking, the torque bar may experience different modes of vibration. For mid-frequency whirl vibration, typically a "wobble" motion occurring during high velocity landing stops, often the torque bar exhibits a small amount of dynamic "whipping" or "jump roping," i.e., movement radially inward and outward with respect to the axis of rotation, leading to lower stability margins. Brake vibration can be a serious issue, and may result in damage to aircraft components if not properly managed. Any damping that can resist that motion may therefore be beneficial.

Figure 3A:
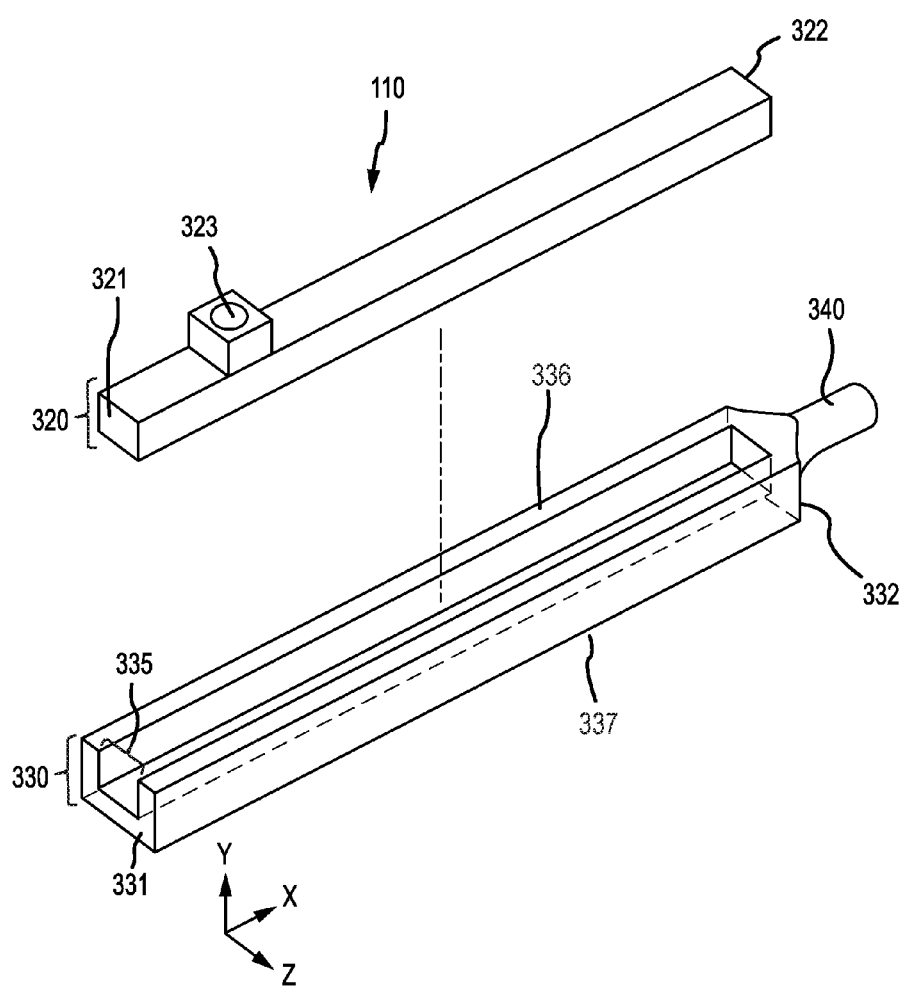
FIG. 3A illustrates an exploded perspective view of a multipart torque bar, in accordance with various embodiments.
Figure 3B:
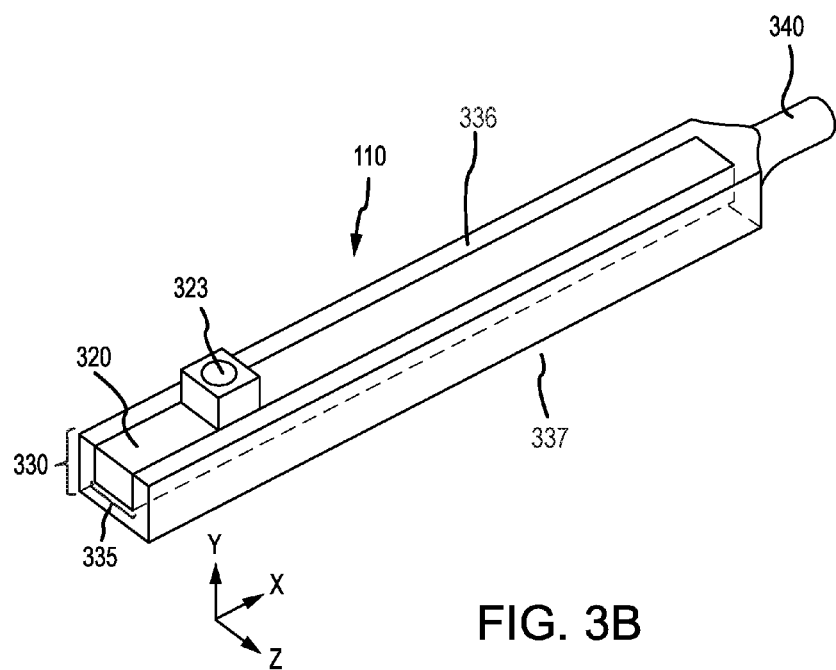
FIG. 3B illustrates a perspective view of a multipart torque bar, in accordance with various embodiments.
Figure 3C:
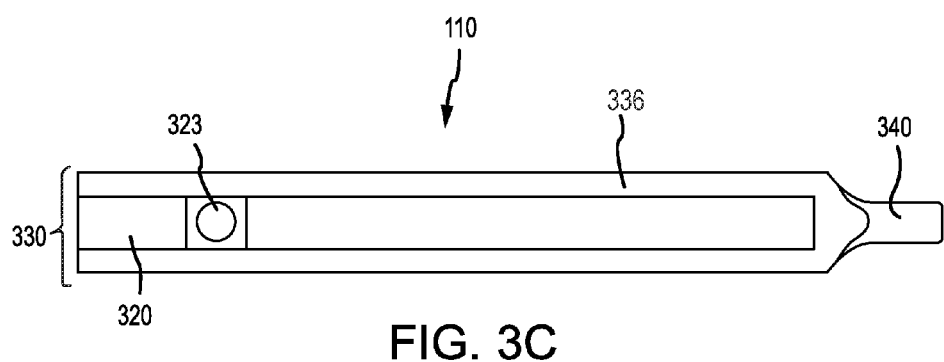
FIG. 3C illustrates a top view of a multipart torque bar, in accordance with various embodiments.

In various embodiments, and with reference to FIGS. 3A, 3B, and 3C, a multipart torque bar 110 may function to create damping by inducing relative sliding between the multiple parts to dissipate kinetic energy. In this regard, multipart torque bar 110 may create damping by inducing interfacial friction on the interfaces of the parts of multipart torque bar 110. Interfacial sliding and friction creates damping which may be beneficial to lower the vibration level in multipart torque bar 110. For example, when multipart torque bar 110 experiences "jump roping" vibrations, components of the multipart torque bar 110 will slide and rub during the motion, damping the vibration. In various embodiments, multipart torque bar 110 may comprise an outer torque bar body 330, an inner torque bar body 320, a mounting hole 323, and a connecting end 340.

In various embodiments, multipart torque bar 110 may be made using any suitable process such as, for example, machining, investment casting, and or the like. In various embodiments, multipart torque bar 110 may be made by additive manufacturing processes, such as, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, digital light processing, and/or any other suitable additive manufacturing process.

In various embodiments, multipart torque bar 110 may be made of any suitable material. Multipart torque bar 110 may be made from any substantially rigid and durable material. For example, multipart torque bar 110 may comprise a metal material, such as steel or a nickel-based superalloy. Multipart torque bar 110 may also have any suitable coating. In this regard, a suitable coating may comprise a coating that does not have a high coefficient friction such that the surfaces of multipart torque bar 110 would lock, but also does not have a low coefficient friction such that no friction would be generated on the surfaces of multipart torque bar 110. For example, and in various embodiments, a suitable coating may have a coefficient of friction value between 0.3 and 0.6. In various embodiments, a tungsten carbide cobalt coating may be used. Similarly, any other suitable type of coating may also be used. In various embodiments, the use of a coating may function to increase the friction between parts of the multipart torque bar 110, aiding in the damping effect.

In various embodiments, an outer torque bar body 330 may be configured to support and receive an inner torque bar body 320. Outer torque bar body 330 may have a first end 331 and a second end 332, and a top surface 336 and a bottom surface 337. Outer torque bar body 330 may be configured to receive inner torque bar body 320 at first end 331. Outer torque bar body 330 may couple to a connecting end 340 at second end 332. Outer torque bar body 330 may comprise any shape and size suitable to support an inner torque bar body 320. For example, outer torque bar body 330 may comprise a rectangle shape.

Outer torque bar body 330 may comprise a groove 335 opening at first end 331 of top surface 336, and protruding in an axial direction proximate to bottom surface 337. Groove 335 may comprise an opening beginning at first 331 and extending axially towards second end 332. Groove 335 may define an opening on outer torque bar body 330 having sufficient length, width, and depth to fit and receive the inner torque bar body 320. In this regard, groove 335 may be any suitable length, width, and depth such that the inner torque bar body 320 may fit entirely and evenly into outer torque bar body 330, in response to inner torque bar body 320 being inserted into outer torque bar body 330.

In various embodiments, groove 335 may be formed into any shape suitable to fit and receive inner torque bar body 320. For example, groove 335 may be formed into a box joint having a substantially square shape. In this regard, inner torque bar body 320 may then be formed into a similar shape, such that inner torque bar body 320 may still operatively insert within groove 335.

Figure 4:
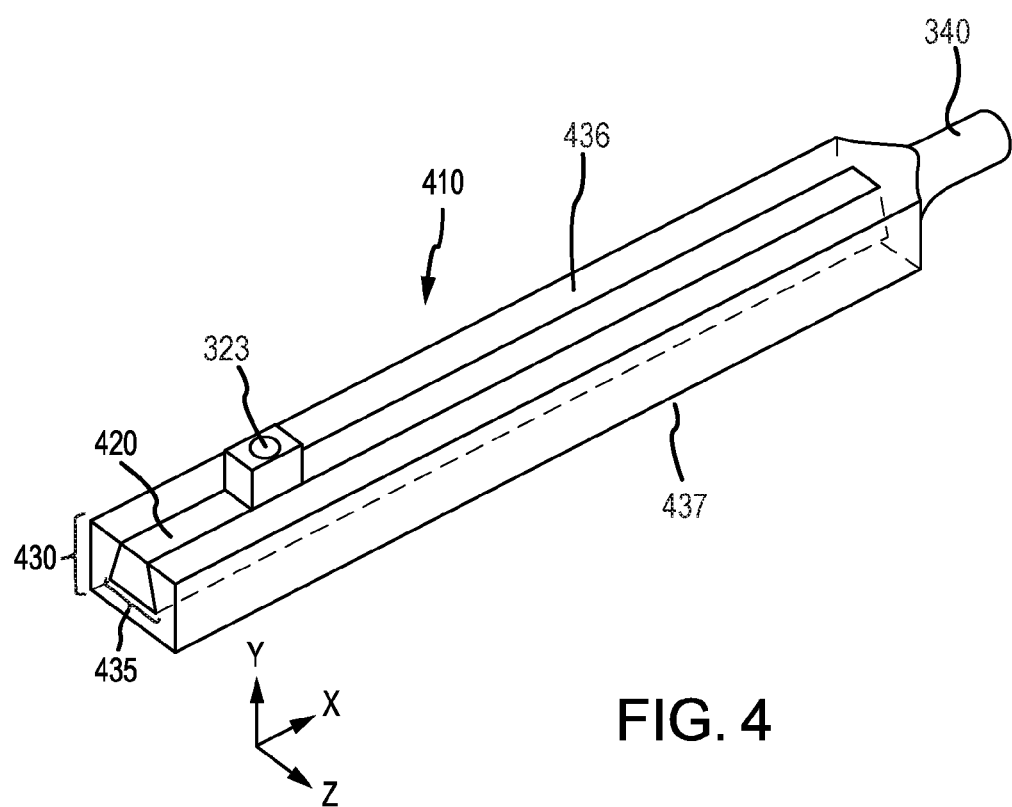
FIG. 4 illustrates a perspective view of a multipart torque bar, in accordance with various embodiments.

In various embodiments and with reference to FIG. 4, groove 435 of torque bar 410 may also be formed into a dove-tail joint having a tapered shape. Groove 435 may be tapered such that the width of groove 435 is smaller proximate the top surface 436 of outer torque bar body 430, and becomes larger in width as groove 435 extends in a direction proximate the bottom surface 437 of outer torque bar body 430. In this regard, inner torque bar body 420 may be formed to have a similar tapered, dove-tailed shape, such that inner torque bar body 420 may operatively insert within the dove-tailed groove 435. In various embodiments, groove 435 and inner torque bar body 420 may be formed into any suitable matching or complimentary shape.

In various embodiments, and with reference again to FIGS. 3A, 3B, and 3C, an inner torque bar body 320 may be configured to removably insert within outer torque bar body 330. Inner torque bar body 320 may have a first end 321 and a second end 322. When inner torque bar body 320 is operatively inserted into groove 335 of outer torque bar body 330, first end 321 of inner torque bar body 320 may be the end closest to the first end 331 of outer torque bar body 330, and second end 322 of inner torque bar body 320 may be the end closest to the second end 332 of outer torque bar body 330. Inner torque bar body 320 may comprise and/or couple to a mounting hole 323 near first end 321 of inner torque bar body 320. Inner torque bar body 320 may be any shape or size suitable to removably insert within outer torque bar body 330. For example, inner torque bar body 320 may comprise a rectangle shape.

In various embodiments, a mounting hole 323 may be configured to removably couple the multipart torque bar 110 to a radially inner surface of a wheel. Mounting hole 323 may be located on a top surface of inner torque bar body 320, near the first end 321 of inner torque bar body 320. Mounting hole 323 may be configured to provide for coupling multipart torque bar 110 to radially inner surface of a wheel. For example, as illustrated in FIG. 1, a bolt 130 can be passed through mounting hole 323 and into a bolt hole in radially inner surface 104. The bolt 130 may then be tightened to couple multipart torque bar 110 to radially inner surface 104. Mounting hole 323 may comprise any shape and size suitable to removably couple the multipart torque bar 110 to radially inner surface 104.

In various embodiments, a connecting end 340 may be configured to couple multipart torque bar 110 to wheel. Connecting end 340 may be located at the second end 332 of outer torque bar body 330. Connecting end 340 may comprise any connection type suitable to couple multipart torque bar 110 to wheel. In this regard, wheel may comprise a connecting hole allowing connecting end 340 to insert within the connecting hole. For example, and in various embodiments, connecting end 340 may comprise a pin end connector. Wheel may comprise a pin receptacle configured to receive pin end connector. Multipart torque bar 110 may then couple to wheel by sliding the pin end connector into the pin receptacle. However, any manner of coupling multipart torque bar 110 with wheel is within the scope of the present disclosure.

Figure 5:
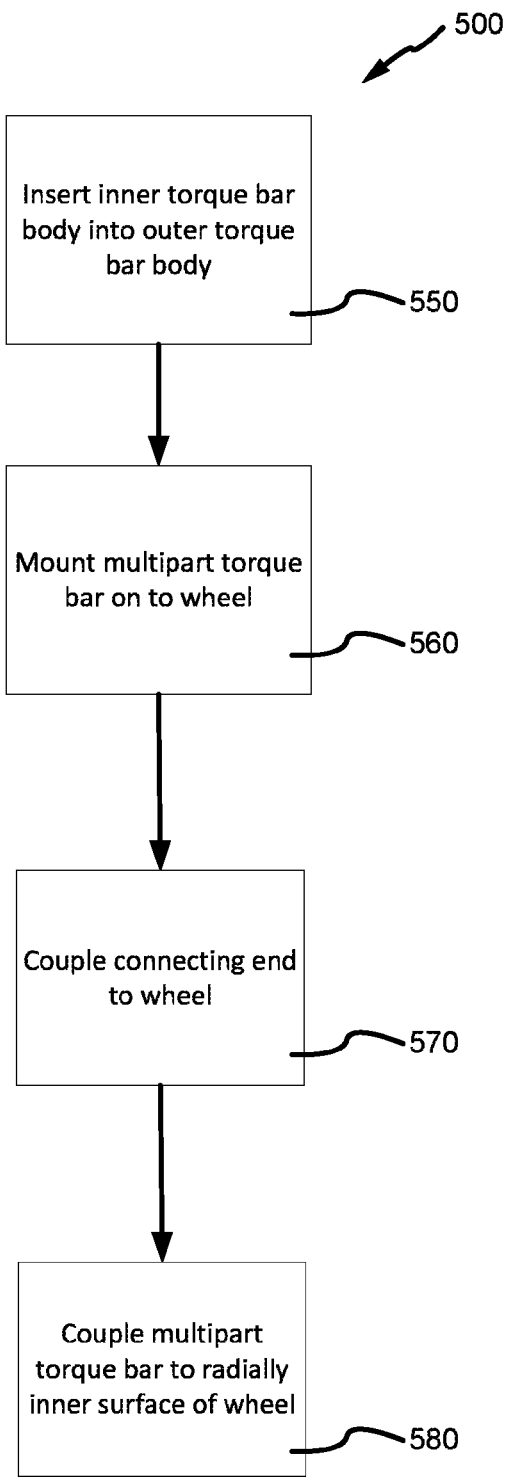
FIG. 5 illustrates a method of installing a multipart torque bar, in accordance with various embodiments.

In various embodiments, and with reference to FIG. 5, a method 500 for installing multipart torque bar is provided. Method 500 may comprise inserting inner torque bar body into outer torque bar body (Step 550). In Step 550, inserting inner torque bar body into outer torque bar body may comprise any suitable means of inserting inner torque bar body into outer torque bar body. Method 500 may comprise mounting multipart torque bar on to a wheel (Step 560). Method 500 may comprise coupling connecting end to wheel (Step 570). For example, in step 570 coupling connecting end to wheel may comprise coupling connecting end to wheel using a pin end connector. Step 570 may also comprise coupling connecting end to wheel using any other suitable method. Method 500 may comprise coupling multipart torque bar to radially inner surface of wheel (Step 580). In Step 580, multipart torque bar may be coupled to radially inner surface by inserting a bolt through mounting hole and into radially inner surface. In Step 580, coupling multipart torque bar to radially inner surface of wheel may also include coupling multipart torque bar to radially inner surface using any other suitable means. However, any method of installing multipart torque bar is also within the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multipart torque bar, comprising:
    an outer torque bar body having a first end and a second end, a top surface and a bottom surface, and a groove, wherein the groove defines an opening on the outer torque bar body beginning on the first end of the top surface and extending in an axial direction proximate the second end; and
    an inner torque bar body having a first end, a second end, a top surface, and a bottom surface, wherein the inner torque bar body is configured to be removably inserted within the groove of the outer torque bar body.

2. The multipart torque bar of claim 1, further comprising a mounting hole located on the top surface of the inner torque bar body proximate the first end of the inner torque bar body.

3. The multipart torque bar of claim 1, further comprising a connecting end located on the second end of the outer torque bar body.

4. The multipart torque bar of claim 3, wherein the connecting end is a pin end connector.

5. The multipart torque bar of claim 1, wherein the groove is in a shape of a box joint.

6. The multipart torque bar of claim 1, wherein the groove is in a shape of a dove-tail joint.

7. The multipart torque bar of claim 1, wherein the multipart torque bar is coated with a tungsten carbide cobalt coating.

8. A wheel and brake assembly, comprising:
a wheel having a radially inner surface and an at least one connecting hole; and
a multipart torque bar comprising:
an outer torque bar body having a first end and a second end, a top surface and a bottom surface, and a groove, wherein the groove defines an opening on the outer torque bar body beginning on the first end of the top surface and extending in an axial direction proximate the second end;
an inner torque bar body having a first end and a second end and a top surface and a bottom surface, wherein the inner torque bar body is configured to be removably inserted within the groove of the outer torque bar body;
a mounting hole located on the top surface of the inner torque bar body by the first end of the inner torque bar body; and
a connecting end located on the second end of the outer torque bar body;
wherein the multipart torque bar is coupled to the radially inner surface at the mounting hole, and the connecting end is coupled to the at least one connecting hole.

9. The wheel and brake assembly of claim 8, wherein the groove is in a shape of a box joint.

10. The wheel and brake assembly of claim 8, wherein the groove is in a shape of a dove-tail joint.

11. The wheel and brake assembly of claim 10, wherein the inner torque bar body comprises a dove-tail shape.

12. The wheel and brake assembly of claim 8, wherein the multipart torque bar is coated with a tungsten carbide cobalt coating.

13. The wheel and brake assembly of claim 8, wherein the connecting end is a pin end connector.

14. The wheel and brake assembly of claim 8, wherein the multipart torque bar is formed by an investment casting process.

15. A method, comprising:
inserting an inner torque bar body into an outer torque bar body to form a multipart torque bar, wherein the outer torque bar body comprises a first end and a second end, a top surface and a bottom surface, and a groove, wherein the groove defines an opening on the outer torque bar body beginning on the first end of the top surface and extending in an axial direction proximate the second end, and wherein the inner torque bar body is configured to removably insert within the groove of the outer torque bar body;
mounting the multipart torque bar onto a wheel and brake assembly, wherein the wheel and brake assembly comprises a wheel having a radially inner surface and a connecting hole; and
coupling the multipart torque bar to the wheel and brake assembly.

16. The method of claim 15, wherein the outer torque bar body further comprises a connecting end located at the second end, and the inner torque bar body further comprises a mounting hole located on the top surface of the inner torque bar body proximate the first end.

17. The method of claim 16, wherein coupling the multipart torque bar to the wheel and brake assembly comprises coupling the connecting end to the wheel and coupling the multipart torque bar to the radially inner surface.

18. The method of claim 15, wherein coupling the multipart torque bar to the radially inner surface comprises inserting a bolt through the mounting hole and securing the bolt into a bolt hole in the radially inner surface.

19. The method of claim 15, wherein the groove is in a shape of a box joint.

20. The method of claim 15, wherein the groove is in a shape of a dove-tail joint.

* * * * *